United States Patent [19]

Gaitan

[11] 4,186,688
[45] Feb. 5, 1980

[54] RESTRAINING DEVICE FOR CATTLE

[76] Inventor: Edward W. Gaitan, 9129 Houston, Hanford, Calif. 93230

[21] Appl. No.: 890,694

[22] Filed: Mar. 27, 1978

[51] Int. Cl.² .............................................. A01K 15/00
[52] U.S. Cl. ...................................... 119/96; 119/128
[58] Field of Search ............... 119/126, 127, 128, 98, 119/96, 105; 128/352, 353, 324, 134; 54/72

[56] References Cited

U.S. PATENT DOCUMENTS

| | | | |
|---|---|---|---|
| 540,069 | 5/1895 | Morgan | 54/72 |
| 589,071 | 8/1897 | Carr | 119/128 |
| 3,423,094 | 1/1969 | Auslander et al. | 119/126 X |

Primary Examiner—Hugh R. Chamblee
Attorney, Agent, or Firm—Huebner & Worrel

[57] ABSTRACT

A restraining device for cattle particularly suited for restraining a cow during delivery of a calf, the device includes an elongated bar having a pair of telescoping segments and a bolt extending therethrough for releasably securing the segments in a fixed relationship, a pair of cuffs pivotally connected to the opposite ends of the bar, each being adapted individually to receive a leg of a cow, a pair of stirrups suspended from the bar adapted to receive a pair of human feet, and a pair of eyes affixed to the bar adapted with a pair of spikes extended therethrough for securing the bar to the ground.

2 Claims, 5 Drawing Figures

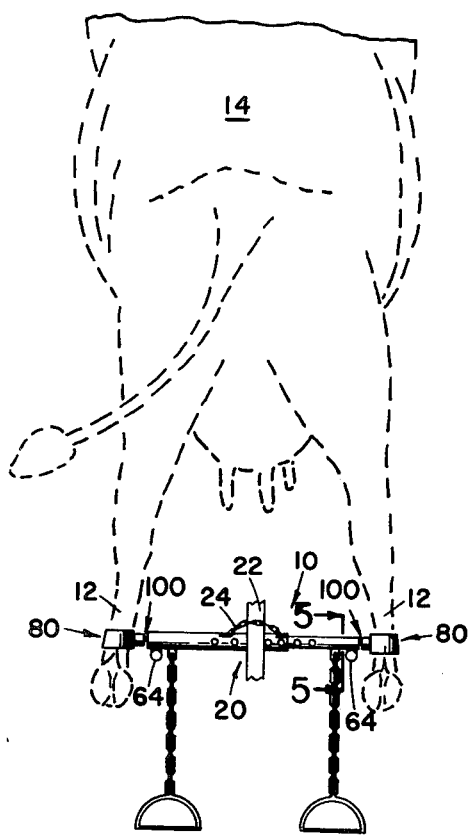
FIG. 1
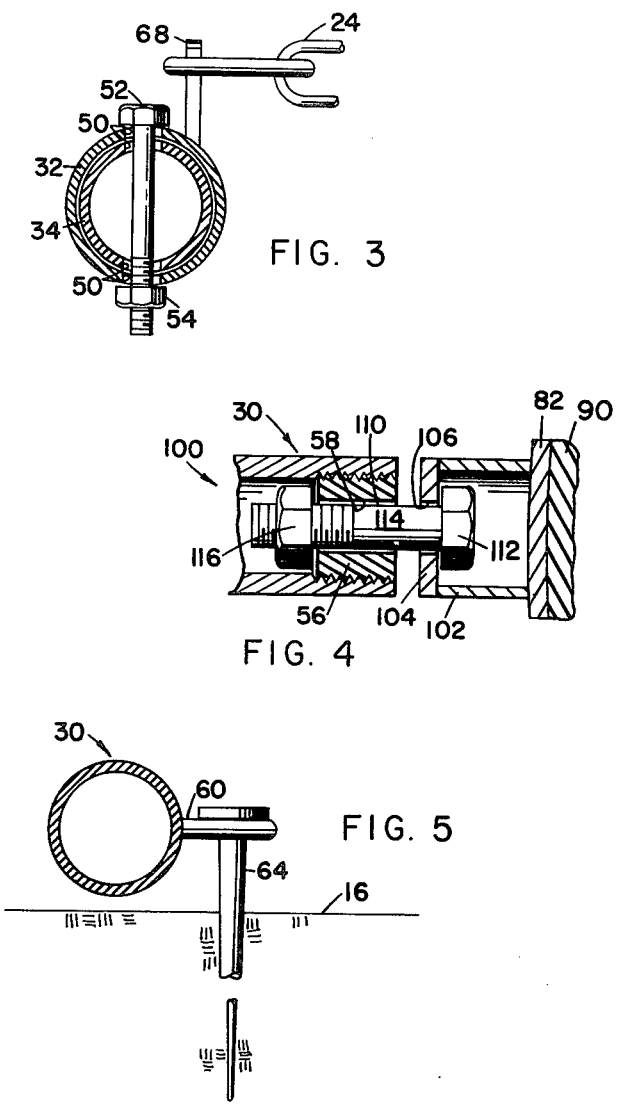
FIG. 3
FIG. 4
FIG. 5
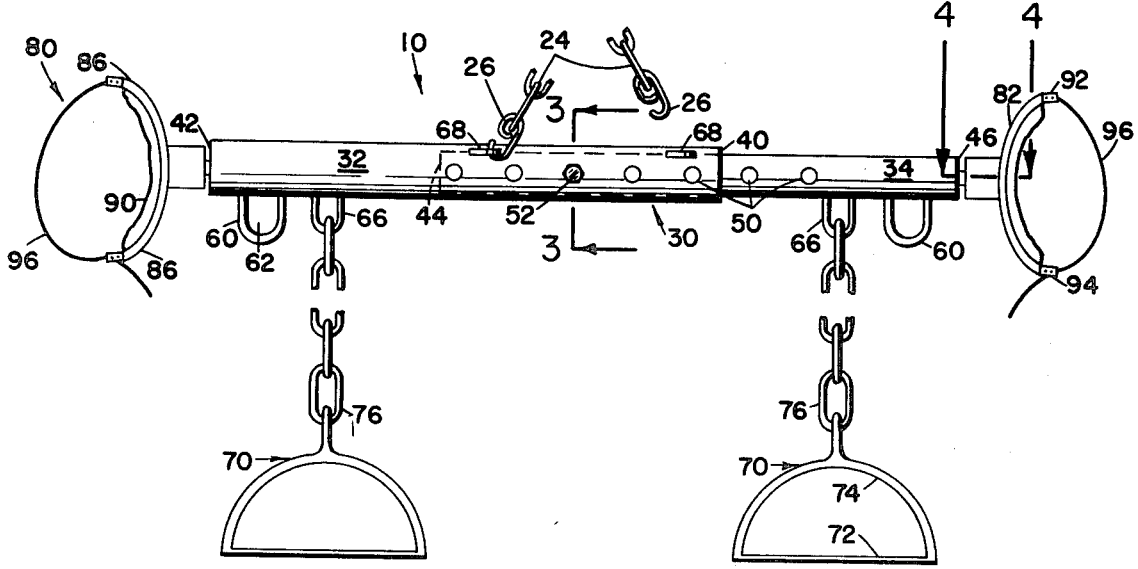
FIG. 2

RESTRAINING DEVICE FOR CATTLE

BACKGROUND OF THE INVENTION

1. Field of the Invention

The present invention relates to a restraining device for cattle, and more particularly to such a device for restraining the hind legs of a cow during delivery of a calf and adapted to support other devices and/or persons assisting in such delivery.

2. Description of the Prior Art

While the prior art includes numerous devices for restraining cattle, insofar as the applicant is aware none is known for restraining the hind legs of a cow while the cow is extended in a prone position on her belly.

It often is necessary to treat a cow supported in a prone position such as in the delivery of a calf, with her hind legs rearwardly extended and separated transversely.

As is well known, so long as a cow is capable of positioning one leg beneath her body great difficulty is experienced in restraining the cow from getting up. Consequently, to be effective, any restraining device must be capable of assuring that a cow restrained thereby cannot position her leg beneath her body.

Moreover, any restraining device employed in the delivery of a calf must be adjustable to cows of varying sizes and proportions in order to accommodate treatment of any cow of a given herd. During treatment it often is necessary to "push" a calf being delivered toward the cow or at different stages during a delivery to "pull" the calf away from the cow employing a prior art "calf-puller." Additionally, it sometimes becomes necessary to forceably replace a placenta in a pushing mode. During both such pulling or pushing of the calf, or the placenta, considerable force must usually be exerted.

Therefore, as can readily be appreciated, there currently exists a need for a device for use in restraining a cow for treatment, such as when experiencing difficulty during delivery of a calf, particularly where manual or mechanical assistance is required.

OBJECTS AND SUMMARY OF THE INVENTION

Accordingly, it is an object of the instant invention to provide an improved restraining device for cattle which overcomes the aforementioned difficulties and disadvantages.

Another object is to provide such a device which secures the cow in a prone position relative to the ground.

Another object is to provide such a restraining device which is portable, rugged, and adapted for use in the field in assisting in the delivery of a calf.

Another object is to provide a device which is adaptable for use in restraining cows of any size and/or proportion without injury to portions of the cow engaged by the device.

Another object is to provide such a device which can be effectively and conveniently engaged by a person or mechanical device for applying force to a calf during its delivery.

These, together with other objects and advantages are obtained through the use of a longitudinally telescoping, elongated bar adapted to be releasably secured at a predetermined length, a pair of cuffs adapted individually to receive the legs of a cow and swivelling about the longitudinal axis of the bar, a pair of stirrups, adapted for receiving human feet, connected to the bar, a pair of eyes affixed to the bar and adapted to receive supporting spikes, and connections for supporting a calf-puller.

BRIEF DESCRIPTION OF THE DRAWINGS

FIG. 1 is a plan view of a restraining device for cattle which embodies the principles of the instant invention depicting the device in an operative environment.

FIG. 2 is a fragmented plan view of the restraining device of FIG. 1 on an enlarged scale.

FIG. 3 is a section taken at line 3—3 of FIG. 2, on a further enlarged scale.

FIG. 4 is a fragmentary section taken on line 4—4 of FIG. 2 on an enlarged scale.

FIG. 5 is a section taken on line 5—5 of FIG. 1 on an enlarged scale showing a ground engaging spike.

DESCRIPTION OF THE PREFERRED EMBODIMENT

Referring with more particularity to the drawings, in FIG. 1 there is shown a restraining device which embodies the principles of the instant invention, generally designated 10.

The device 10, as shown, is positioned in engaging relation with the lower portions 12 of the hind legs of a cow 14. The cow is shown in a belly-downward, prone position with her hind legs rearwardly extended. The lower portions of the legs are disposed in engagement with the ground surface 16. Attached to the device is a "calf-puller" 20 having a tongue 22 connected by a simple chain 24. The chain is provided with an individual hook 26 connected to the restraining device, as subsequently will be described.

The restraining device 10 includes an elongated cylindrical bar 30 formed by a larger diameter tubular segment 32, and a telescopically related, smaller diameter tubular segment 34, FIG. 2. The smaller segment 34 is fitted axially into the interior of the larger segment 32 axially of the bar, as best shown in FIGS. 2 and 3. The larger segment 32 has an inner end portion 40 disposed centrally of the bar 30 in circumscribing relation with the smaller segment 34 and an outer end portion 42. The smaller segment 34 includes an inner end portion 44 centrally related to the bar 30 and an outer end portion 46. The inner end portions of the segments 32 and 34 having formed therein a plurality of diametrically oriented bores 50 of substantially equal diameters.

The bores 50 are disposed in coaxially aligned pairs individually extending through the opposite sides of the segments. The axes of the pairs of bores are spaced along their respective segments and lie in a common diametrically oriented plane. A bolt 52 is extended through a given pair of bores so as to secure the segments 32 and 34 in a fixed axial relationship. The bolt 52 preferably is secured in position by a suitable nut threadably engaged therewith.

The outer end portions of segments 32 and 34 individually are provided with an externally screw threaded plug or insert 56 as best shown in FIG. 4, secured within the respective outer end portions 42 or 46 by an internal thread, not designated, mated with the external thread provided for the insert. Each insert has a central bore 58 extending axially therethrough, the purpose of which will hereinafter become more readily apparent.

Each of the segments 32 and 34 includes an eye 60, best shown in FIGS. 2 and 5, affixed thereto, as by welding or the like. Each of the eyes 60 extends substantially diametrically from the segment to which it is affixed and includes an opening 62 extending therethrough for receiving one of a pair of spikes 64.

The pair of spikes 64 are provided to be inserted through the eyes 60 and each is dimensioned so as to be loosely fitted therein for securing the bar 30 to the ground. Each of the segments 32 and 34 also has an eye 66 affixed thereto, as by welding, or the like, somewhat inwardly spaced from the respective eyes 60. The eyes 66 also extend transversely from the segments in substantial parallelism with the eyes 60. The larger diameter segment 32 is provided with a further pair of eyes 68 affixed thereto, also by welding or the like. As best shown in FIG. 3, the pair of eyes 68 extend transversely from the segment 32 substantially in a plane disposed at right angles to the plane of the eyes 60 and 68. The spacing between the eyes 68 is such that the eyes are centrally disposed along the bar 30 when the segments 32 and 34 thereof are secured together.

To the restraining device 10 there is connected a pair of D-shaped stirrups 70. These stirrups are suspended from the bar 30 as shown in FIGS. 1 and 2. As a practical matter, each stirrup is provided with a straight bar portion 72 having opposite ends adapted to receive therebetween the side of a human foot interiorly of the stirrup. Each stirrup also includes an arcuate portion 74 individually connected at its opposite ends to the opposite ends of the bar portion 72 and is interconnected to the bar 30 by one of a pair of chains 76 connected to an eye 66.

The outer ends 42 and 46, respectively, of the segments 32 and 34 are individually provided with a pair of cuffs, indicated generally by the numeral 80, and best shown in FIG. 2. Each of these cuffs is swivel-mounted for pivotal movement about an axis substantially coincident with the longitudinal axis of the bar 30. Each cuff includes an elongated, arcuate plate 82 which may be cast or made of sheet material or the like.

The plate 82 is curved about an axis substantially paralleling its transverse axis defining for the plate opposite concave and convex sides, FIG. 2, having longitudinally spaced ends 86. The concave side of the plate is provided with a pad 90 of relatively soft, resilient material, such as rubber, which extends between the opposite ends of the plate. One end of each cuff is provided with a belt hinge 92 while the opposite end thereof is provided with a buckle 94. A flexible strip or belt 96 is provided and connected at one end portion thereof to the belt hinge while the opposite end portion of the belt is adapted to be secured to the buckle 94 in the conventional manner. Of course, the metal plate 82 and belt 96, and the related elements are proportioned and dimensioned so as to engage the hocks or lower portions 12 of the hind legs of a cow 14, as shown in FIG. 1.

Each cuff 80 individually is connected with its respective segment 32 or 34, of the bar 30, through a joint comprising a swivel, generally designated 100, FIG. 4. While the swivel 100 is of any suitable design, as shown, each swivel 100 includes a tubular body 102 affixed to and axially extended from the convex side of one of the arcuate plates 82 of the pair of cuffs 80. The body 102 is closed at one end by a disk 104, having defined therein a central bore 106. A suitable bolt 110 is held in captured relation to the cuff with its head, designated 112, being confined within the body while its shank 114 is extended through the bore in the disk.

The body 102 is applied to one of the arcuate plates 82 in any convenient manner, as by welding or the like, while the shank of the bolt 110 is extended axially through the central bore 58 formed in the insert 56 and is screw threadably engaged by a nut 116. Thus each of the cuffs 80 is attached to a segment of the bar 30.

As shown, bolt 110 is loosely fitted in the bores 58 and 106 through which it extends. The axial length of the bolt, between its head and the nut 116, is somewhat greater than the combined length of the bores. As a result the axis of the bolt can be somewhat angularly related to the axes of the bores. This construction of the swivel 100, in practice, permits the cuffs 80 to assume an angular relation to the bar 30, as well as to pivot about the longitudinal axis of the bar.

OPERATION

The operation of the preferred embodiment of the present invention is believed to be clearly apparent, however, in the interest of completeness it briefly is summarized at this point.

To utilize the restraining device 10, herein described, it is attached to the hocks or lower portion of a cow 14 positioned, as shown in FIG. 1, in a prone position with her hind legs rearwardly extended and transversely spread. The length of the bar 30 is adjusted by varying the relationships of the segments 32 and 34 of the bar 30 in a telescoping fashion. The segments are mutually displaced until the cuffs 80 are spaced apart a distance approximately equal to the distance existing between the lower leg portions 12 of the cow. The segments are secured together in mutually fixed relationship simply by inserting the bolt 52 through an aligned pair of bores 50 threading the nut 54 thereon.

The restraining device 10 is then positioned between the hind legs of the cow 14 with the longitudinal axis of the arcuate plates 82 extending transversely of the lower leg portions 12 and with the pads 90 individually engaged therewith. Such positioning of the plates and pads is facilitated by the pivotal and angular movement imparted by the swivels 100 to the plates 82 relative to the bar 30. The belts 96 are then passed around the portions of the legs engaged by the pads and engaged by the respective buckles so that each leg portion is secured in confining relation within a respective cuff 80. Thus the bar 30 is connected to the rearwardly extended hind legs of the cow.

When the lower leg portions 12 are secured to the bar 30 by the cuffs 80, the spikes 64 may, where desired, thus individually be extended through a respective opening 62 in the eyes 60 and driven into piercing engagement with the ground surface 16, as shown in FIG. 5. When the cow 14 is engaged by the restraining device 10, as described in this and preceeding paragraphs she is fixed in position relative to the ground surface since she is prevented, by the restraining device, from positioning a leg beneath her as is required in order for her to rise. Consequently, the cow cannot rise and is completely restrained in a prone position for receiving treatment, such as during a difficult delivery of a calf and/or replacing the cow's placenta.

During delivery of a calf it is frequently necessary to urge the calf inwardly of the cow, as in positioning the calf for relatively easy delivery. When this necessity arises, the veterinarian or other person assisting with the delivery places his feet in the stirrups 70 while manipulating the calf with his hands. The straight portions 72 of the stirrups are conveniently positioned to receive and support the feet of the person assisting delivery to push against. The reaction of pushing is transmitted through the chains 76, bar 30 and cuffs 80 to the cow, and as well as the spikes 64, so that the cow does not move away from the person.

If during delivery of a calf it is necessary to draw the calf outwardly of the cow 14, employing a well known "calf-puller" 20, the tongue 22 of the puller is connected to the bar 30 of the restraining device 10. Such connection is made simply by engaging the hooks 26 with the eyes 68 while the chain 24 is passed over the tongue 22 of the calf-puller. The calf-puller is then operated in the conventional fashion.

The restraining device is detached from the cow 14 by releasing the buckles 94 so that the lower leg portions 12 are no longer constrained. The spikes 64 are then withdrawn from the ground surface 16. The restraining device readily can then be transported to another location to be fitted to another cow in need of treatment.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An improved restraining device particularly suited for use in treating a cow, such as a cow experiencing difficulty in the delivery of a calf, comprising in combination:
    A. a bar including a pair of telescopically related segments and means including a bolt extended diametrically through both segments for securing the segments against relative axial displacement;
    B. a cuff connected to each of the opposite ends of said bar and supported thereby for pivotal motion about an axis coincident with the longitudinal axis of said bar and adapted to receive a portion of one leg of the cow and means including a strap adapted to be passed around the received portion of the leg for securing the leg to the cuff;
    C. means for supporting said bar against displacement including a pair of chains having a pair of stirrups attached thereto suspended from the bar, said stirrups being adapted to receive a pair of human feet in supporting relation, and means including a pair of eyes affixed to the bar and a pair of spikes extended through the eyes for securing the bar to the ground; and
    D. means for attaching the tongue of a calf-puller to the bar.

2. An improved restraining device particularly suited for use in treating a cow lying on the ground in a prone position comprising:
    A. an elongated bar including a pair of telescopically related segments, and locking means for releasably securing said segments in a mutually fixed relationship;
    B. a pair of cuffs adapted to receive in confining relation hocks of a cow, and swivel means interconnecting the cuffs of the pair with the opposite ends of the bar;
    C. means for securing said bar against displacement relative to the cow including a pair of eyes welded to said bar and a pair of spikes extended therethrough into a penetrating relationship with the ground, and a pair of stirrups suspended from the bar adapted to receive a pair of human feet; and
    D. means for mounting on said bar a tongue of a calf-pulling mechanism.

* * * * *